(12) United States Patent
Douglas et al.

(10) Patent No.: US 6,837,270 B2
(45) Date of Patent: Jan. 4, 2005

(54) GAS DELIVERY SYSTEM AND PNEUMATIC YOKE FOR A PRESSURIZED GAS RESERVOIR

(76) Inventors: Andrew S. Douglas, 5 Windsor Cr., London, Ontario (CA), N6C 1V6; Patrick A. Walsh, 513 Canterbury Road, London, Ontario (CA), N6G 2N5

(*) Notice: Subject to any disclaimer, the term of this patent is extended or adjusted under 35 U.S.C. 154(b) by 233 days.

(21) Appl. No.: 10/303,881

(22) Filed: Nov. 26, 2002

(65) Prior Publication Data
US 2004/0099317 A1 May 27, 2004

(51) Int. Cl.$^7$ ............................. E03B 1/00; F16K 37/00
(52) U.S. Cl. ..................... 137/613; 137/557; 251/89.5; 251/148; 251/152; 128/205.24; 128/204.26
(58) Field of Search ................................. 137/557, 613; 251/148, 149.6, 89.5, 152; 128/205.24, 204.26

(56) References Cited

U.S. PATENT DOCUMENTS

| | | | |
|---|---|---|---|
| 1,706,051 A | * | 3/1929 | Auchincloss ................ 220/316 |
| 2,119,473 A | * | 5/1938 | Smith et al. ................ 251/61.3 |
| 2,591,531 A | | 4/1952 | Fishback |
| 2,819,097 A | * | 1/1958 | Lang ............................ 285/81 |
| 2,823,699 A | * | 2/1958 | Willis .................... 137/625.26 |
| 2,861,821 A | | 11/1958 | Harter |
| 3,291,152 A | | 12/1966 | Comer |
| 3,383,124 A | * | 5/1968 | Wickens ....................... 285/83 |
| 3,606,390 A | * | 9/1971 | Taylor .......................... 285/39 |
| 4,056,145 A | | 11/1977 | Jett et al. |
| 4,087,119 A | | 5/1978 | Capdebosc et al. |
| 4,361,165 A | | 11/1982 | Flory |
| 4,371,004 A | | 2/1983 | Sysolin et al. |
| 4,543,995 A | | 10/1985 | Weh et al. |
| 4,944,292 A | * | 7/1990 | Gaeke et al. ........... 128/204.18 |
| 5,282,493 A | * | 2/1994 | Schwartz et al. ............ 137/613 |
| 5,704,589 A | * | 1/1998 | Canuteson ................... 251/291 |
| 5,765,611 A | | 6/1998 | Miller |
| 5,960,841 A | | 10/1999 | Green |
| 6,386,248 B2 | | 5/2002 | Johnston et al. |
| 6,416,036 B2 | | 7/2002 | Yagi et al. |

\* cited by examiner

*Primary Examiner*—A. Michael Chambers
(74) *Attorney, Agent, or Firm*—Anissimoff and Associates; Robert A. H. Brunet

(57) ABSTRACT

The present invention provides a pneumatic yoke for a pressurized gas reservoir. The yoke comprises an aperture for receiving a stem of the pressurized gas reservoir, the stem having a stem valve selectively operable to permit a flow of pressurized gas through an opening of the stem; a gas passage for alignment with the opening of the stem to accept the flow of pressurized gas; a gas diverting conduit in fluid communication with the gas passage; a movable clamping member within the gas diverting conduit, the movable clamping member having a surface forming a boundary of the conduit, the boundary displaceable by a flow of gas into the conduit to thereby vary the volume of the conduit to thereby engage the clamping member with the stem; and, a release valve in fluid communication with the gas diverting conduit, the release valve selectively operable to permit a flow of gas from the conduit to permit disengagement of the movable clamping member with the stem. The yoke may be used in a gas delivery system, particularly in home oxygen gas delivery systems.

22 Claims, 3 Drawing Sheets

GAS DELIVERY SYSTEM AND PNEUMATIC YOKE FOR A PRESSURIZED GAS RESERVOIR

FIELD OF THE INVENTION

The present invention relates to a gas delivery system and pneumatic yoke for a pressurized gas reservoir.

BACKGROUND OF THE INVENTION

Yokes are used to couple pressurized gas reservoirs, for example compressed gas cylinders, to other parts of compressed gas systems, for example pressure or flow regulators. When changing gas cylinders, it is generally desirable to be able to easily and quickly connect and disconnect the yoke from the gas cylinder while ensuring a proper seal when the yoke is connected. Of particular concern are gas cylinders for home use, such as oxygen cylinders coupled to breathing apparatuses for home respiratory units. Home respiratory units are generally employed by aged or infirm people who must be able to quickly and easily change oxygen cylinders once the cylinder is empty.

U.S. Pat. No. 6,416,036 issued Jul. 9, 2002 to Yagi et al. discloses a sealing arrangement between a flow regulator and a shut-off valve of a gas cylinder. However, changing gas cylinders requires manually turning a screw bolt to lock the sealing arrangement in place on the gas cylinder. The screw bolt can be difficult and dangerous for a person to operate, particularly when disconnecting the sealing arrangement since the system is under pressure from the cylinder contents.

SUMMARY OF THE INVENTION

According to an aspect of the invention, there is provided a pneumatic yoke for a pressurized gas reservoir, the yoke comprising:
(a) an aperture for receiving a stem of the pressurized gas reservoir, the stem having a stem valve selectively operable to permit a flow of pressurized gas through an opening of the stem;
(b) a gas passage for alignment with the opening of the stem to accept the flow of pressurized gas;
(c) a gas diverting conduit in fluid communication with the gas passage;
(d) a movable clamping member within the gas diverting conduit, the movable clamping member having a surface forming a boundary of the conduit, the boundary displaceable by a flow of gas into the conduit to thereby vary the volume of the conduit to thereby engage the clamping member with the stem; and,
(e) a release valve in fluid communication with the gas diverting conduit, the release valve selectively operable to permit a flow of gas from the conduit to permit disengagement of the movable clamping member with the stem.

According to another aspect of the invention, there is provided a gas delivery system comprising:
(a) a pressurized gas reservoir comprising a tank containing pressurized gas, a stem connected to the tank, the stem having a stem valve selectively operable to permit a flow of pressurized gas through an opening of the stem;
(b) a yoke comprising: an aperture for receiving the stem of the pressurized gas reservoir; a gas passage for alignment with the opening of the stem to accept the flow of pressurized gas; a gas diverting conduit in fluid communication with the gas passage; a movable clamping member within the gas diverting conduit, the movable clamping member having a surface forming a boundary of the conduit, the boundary displaceable by a flow of gas into the conduit to thereby vary the volume of the conduit to thereby engage the clamping member with the stem; and, a release valve in fluid communication with the conduit, the release valve selectively operable to permit a flow of gas from the gas diverting conduit to permit disengagement of the movable clamping member with the stem; and,
(c) a gas flow and/or pressure regulator mounted on the yoke in fluid communication with the gas passage to accept flow of pressurized gas.

According to another aspect of the invention, there is provided a pneumatic yoke for a pressurized gas cylinder, the yoke comprising:
(a) an aperture for receiving a stem of the pressurized gas cylinder, the stem having a stem valve selectively operable to permit a flow of pressurized gas through an opening of the stem;
(b) a gas passage for alignment with the opening of the stem to accept the flow of pressurized gas;
(c) a gas diverting conduit in fluid communication with the gas passage, a portion of the gas diverting conduit being a chamber;
(d) a piston having a piston barrel complementary to and movable within the chamber and having a tapered clamping pin extending into the aperture for engagement with the stem, the piston displaceable by a flow of gas into the chamber to thereby vary the volume of the chamber to thereby engage the tapered clamping pin with the stem; and,
(e) a release valve in fluid communication with the gas diverting conduit, the release valve selectively operable to permit a flow of gas from the conduit to permit disengagement of the tapered clamping pin with the stem.

Generally, the yoke of the present invention works on the principle of diverting a portion of the pressurized gas from its normal gas flow path to effect engagement of the movable clamping member of the yoke with the stem of the gas reservoir. The pressure of the gas on the movable clamping member is sufficient to clamp the yoke to the stem. Releasing the pressure on the movable clamping member by means of the release valve permits disengagement of the movable clamping member with the stem, thus the yoke may be removed from the gas reservoir to be used on another gas reservoir.

The aperture in the yoke is adapted to receive the stem of a pressurized gas reservoir. The aperture may be any convenient shape and size, provided that it can receive the stem such that the opening of the stem comes into alignment with the gas passage of the yoke. Additionally, the aperture is preferably of a shape in which the stem may be comfortably accommodated to minimize slippage when the movable clamping member is engaged with the stem but which maximizes the ease by which the stem may be removed from the aperture when the movable clamping member is disengaged with the stem.

In operation, the opening of the stem and the gas passage of the yoke are aligned so that the gas passage may accept a flow of pressurized gas from the opening. Preferably, the gas passage is sealingly mated with the opening to prevent or reduce leakage of gas from the yoke. Obtaining a gas-tight seal may be conveniently accomplished by machining the gas passage to snugly mate with the opening of the stem. A suitably sized sealing element, for example an O-ring, may also be used to help create a gas-tight seal. The sealing element may comprise any suitable material for use in sealing elements of pneumatic devices, such as neoprene or other elastomeric or thermoplastic materials.

The stem of a pressurized gas reservoir typically comes equipped with a dimple or set of dimples located near the opening of the stem. The number and arrangement of the dimples depends on the type of gas in the gas reservoir and is standardized by international regulation. For example, the stem of an oxygen cylinder has two dimples, located just below and to each side of the opening of the stem. Any yoke or regulating device attached to the stem must carry a corresponding pin or set of pins arranged to fit in the dimples when the gas reservoir is in operation. Attempting to attach a yoke or regulator that does not have the correct corresponding set of pins to fit in the dimples will result in failure to attach the yoke or regulator to the stem. Therefore, the aperture of the yoke is preferably equipped with a pin or set of pins located near the gas passage, which correspond in position and size to the dimple or dimples on the stem of the gas reservoir. It is evident, therefore, that a given yoke must be customized for a particular type of gas reservoir in respect of the standardized arrangement of dimples by including in the aperture a standardized arrangement of pins which correspond to the dimples.

In fluid communication with the gas passage is the gas diverting conduit. The gas diverting conduit can be of any suitable cross-sectional shape, although a substantially circular cross-sectional shape is preferred. The gas diverting conduit begins at the gas passage and ends with the movable clamping member. The movable clamping member is partially disposed within the gas diverting conduit and moves within the gas diverting conduit in response to a flow of gas in the conduit. Thus, a first portion of the movable clamping member is disposed within the conduit. The first portion of the clamping member comprises a surface against which the flow of gas in the conduit may push. A second portion of the movable clamping member extends into the aperture. In operation, when the flow of pressurized gas in the conduit pushes against the surface of the first portion of the clamping member, the clamping member moves and the second portion of the movable clamping member engages with the stem thereby clamping the yoke to the stem.

Near the end of the gas diverting conduit, a portion of the gas diverting conduit may be a chamber of greater cross-sectional area. Preferably, the first portion of the movable clamping member is disposed within the chamber and the movable clamping member is displaced within the chamber in response to the flow of gas in the gas diverting conduit. Having a chamber of greater cross-sectional area permits the use of a larger movable clamping member having a surface of larger surface area against which the gas may push. This results in greater clamping force for engagement of the second portion of the movable clamping member with the stem.

The gas diverting conduit may also be equipped with a one-way check valve which permits flow of gas from the gas passage to the movable clamping member, but prevents flow of gas back from the movable clamping member to the gas passage. The one-way check valve maintains gas pressure in the conduit between the check valve and the clamping member, even when the flow of gas in the gas passage is turned off or interrupted. Thus, the yoke will remain clamped to the stem even when the gas reservoir is empty.

The first portion of the movable clamping member is preferably in sealing arrangement with the gas diverting conduit (or with the chamber which is an expanded portion of the gas diverting conduit). Thus, cross-sectional shape of the first portion of the movable clamping member is preferably the same or similar to the cross-sectional shape of the conduit (or chamber). Sealing may be accomplished by machining the first portion of the clamping member in close tolerance with the conduit. One or more suitably sized sealing elements, for example O-rings, may also be used to help create a gas-tight seal. The sealing element may comprise any suitable material for use in sealing elements of pneumatic devices, such as neoprene or other elastomeric or thermoplastic materials. In a more preferred embodiment, the first portion of the movable clamping member comprises a piston, which, together with the conduit (or chamber), forms a piston/cylinder arrangement. One or more O-rings may be used to prevent or minimize gas leakage from between the piston and the conduit's wall.

The second portion of the movable clamping member extends into the aperture preferably at a position directly opposite the gas passage such that the opening in the stem and the second portion of the movable clamping member are generally aligned on a single axis. Such an alignment results in more efficient and effective clamping of the yoke to the stem.

The second portion of the movable clamping member extends into the aperture and may be tapered inwardly to form a smaller contact surface with the stem. A smaller contact surface with the stem also increases the clamping force of the clamping member in engagement with the stem. The taper is generally not to a very sharp point to minimize potential damage to the stem. Stems for gas reservoirs are sometimes equipped with an indentation diametrically opposed on the stem from the opening. This indentation is designed to receive a correspondingly shaped element on a yoke or regulator to facilitate clamping of the yoke or regulator on the stem. Thus, the taper of the second portion of the movable clamping member is preferably sized and shaped to fit in the indentation, if one is present, thereby providing better clamping of the yoke to the stem.

The movable clamping member may be equipped with a secondary biasing means, for example an elastic, a manual or a pneumatic biasing means, which biases the clamping member toward the aperture. Preferably, the secondary biasing means is an elastic biasing means, for example a spring. The secondary biasing means is relatively weak and does not provide the main clamping force for clamping the yoke to the stem to create a seal between the gas passage and the opening of the stem. The secondary biasing means facilitates putting the yoke on the stem before the pressurized gas is permitted to clamp the yoke to the stem. Initially, an operator manually places the yoke on the stem such that the gas passage and the opening are aligned. However, before the operator can open the stem valve to permit flow of pressurized gas to effectuate clamping of the yoke to the stem, the gas passage of the yoke and the opening of the stem may be misaligned, which can result in problems in obtaining the desired clamping. The secondary biasing means holds the second portion of the movable clamping member against the stem to help minimize misalignment of the gas passage and opening. Preferably, the secondary biasing means weakly but sufficiently holds the second portion of the movable clamping member in the indentation of the stem, thereby holding the yoke in proper alignment while the operator opens the stem valve. The taper of the second portion of the movable clamping member permits some initial misalignment of the second portion with the indentation when the stem valve is initially opened to permit flow of gas. Once the stem valve is open, the pressurized gas that flows into the gas diverting conduit provides the necessary force for clamping the yoke to the stem securely.

The yoke is also equipped with a release valve, which is selectively operable to vent gas from the gas diverting conduit in order to release pressure on the movable clamping member. The release valve is generally in fluid communication with the gas diverting conduit at a point between the gas passage and the movable clamping member. When a check valve is present, the release valve is located at a point between the check valve and the movable clamping member. The release valve is preferably simply operated by an elderly or infirm person, for example by depressing a handle of the release valve. Any suitable valve may be used as a release valve, for example, needle, gate, globe, ball, butterfly or diaphragm valves may be used. Preferably, a needle valve, such as a Schraeder valve, may be used. In order to remove the yoke from the stem, for example to change gas reservoirs, it is necessary to release the pressure on the surface of the movable clamping member by venting the gas from the gas diverting conduit. When gas is released by operation of the release valve, the clamping member disengages with the stem and the yoke may be easily removed from the stem. Some residual force of the clamping member on the stem may be present due to the secondary biasing means, but the residual force is easily overcome by the operator removing the yoke from the stem. The release valve is preferably selectively operable to vent but is automatically closed when not being operated.

The yoke of the present invention may be constructed of any suitable material, for example, aluminum, brass, bronze, steel, stainless steel, other metals and/or metal alloys, polymers and/or polymer blends. The material should have suitable physical properties for withstanding the pressure of gas in the gas reservoir. Suitable materials for a particular application are well known to one skilled in the art who would have little difficulty in making an appropriate selection.

Pressurized gas reservoirs may take a variety of forms. In one embodiment, the pressurized gas reservoir is a pressurized gas cylinder having a stem with an opening and a stem valve for selectively allowing gas to exit the cylinder through the opening. Other types of pressurized gas reservoirs may comprise a tank with a stem valve remote from the tank. The tank may be of any suitable cross-section, for example circular, elliptical, rectangular or square. The pressurized gas reservoir may contain virtually any type of gas, for example, oxygen, nitrogen, helium, argon, chlorine, ammonia, hydrogen, acetylene, propane, carbon dioxide, anesthetic gases (e.g. NO, ether, etc.), or stable mixtures thereof. The yoke may be adapted for use on any type of pressurized gas reservoir. The yoke is preferably made of a material that is inert to the particular gas in the pressurized gas reservoir.

There is also disclosed a gas delivery system utilizing the yoke of the present invention. The yoke may be used with virtually any gas delivery system, for example, industrial, commercial, SCUBA and medical gas systems. The yoke is particularly beneficial for portable gas systems. In one embodiment, the yoke can be used with medical oxygen systems, for example home oxygen systems, for respirators and the like.

The gas delivery system comprises a pressurized gas reservoir. The pressurized gas reservoir comprises a tank, a stem attached to the tank, the stem having a stem valve selectively operable to permit a flow of pressurized gas through an opening of the stem. The stem valve may be any suitable valve for use on pressurized gas reservoirs, for example, needle, gate, globe, ball or butterfly valves, and the like. The opening in the stem differs in shape and size depending on the type of gas in the reservoir and the size of the reservoir. The gas passage of the yoke is adapted to mate with the opening of the stem, therefore, the yoke is generally built to accommodate a particular type and size of gas reservoir. Preferably, the gas passage and the opening are mated in a sealing manner to form a gas-tight seal.

The gas delivery system also comprises a yoke as described above for coupling the pressurized gas reservoir to a flow or pressure regulator. The regulator is in fluid communication with the gas passage of the yoke in order to accept a flow of pressurized gas from the gas passage. Preferably, the regulator is sealingly mounted on the yoke with a gas-tight seal for greater stability and to prevent or reduce gas leaks. Any suitable type of regulator may be used and one skilled in the art would have little trouble determining an appropriate regulator for a given application. Regulators typically comprise various gauges for measuring pressure and/or flow rate, flow control valves and gas distribution ports for delivering the gas to gas distribution means. Finally, the regulator is in fluid communication with the gas distribution means for final delivery of the gas to a desired location.

To initially mount the yoke on to a gas reservoir, the stem of the gas reservoir is inserted through the aperture of the yoke until the opening of the stem and the gas passage of the yoke are aligned. In one embodiment, the tapered second portion of the movable clamping member is biased against the secondary biasing means by the stem while the stem is being inserted into the aperture until it snaps into place in the indentation on the stem by action of the secondary biasing means thereby automatically aligning the opening and the gas passage. A regulator may be in fluid communication with the yoke either before or after the yoke is mounted on to the gas reservoir, although the regulator is usually placed in fluid communication with the yoke before mounting the yoke on to the gas reservoir.

Opening the stem valve permits a flow of pressurized gas from the gas reservoir to exit through the opening of the stem into the gas passage of the yoke. A first portion of the pressurized gas flows through the gas passage into the regulator which is in fluid communication with the gas passage. A second portion of the pressurized gas flows from the gas passage through the gas diverting conduit to contact the surface of the first portion of the movable clamping member thereby displacing the movable clamping member in the conduit and causing the second portion of the movable clamping member to engage the stem, thus clamping the yoke to the stem. When the stem valve is initially opened, there will be some initial gas leakage between the opening of the stem and the gas passage of the yoke. However, a seal is quickly formed between the opening and the gas passage once the movable clamping member engages the stem with the force resulting from the pressurized gas in the conduit.

In operation, pressurized gas from the gas reservoir flows through the opening of the stem through the gas passage of the yoke into the regulator and hence to the gas distribution means attached to the regulator.

To remove the yoke from the gas reservoir, the stem valve is closed and gas pressure in the yoke is released by actuating the release valve. Once gas pressure has been released, the yoke may be easily removed by sliding the yoke up and over the stem so that the stem is no longer in the aperture. Since the clamping force generated by the pressurized gas is no longer present, the removal operation is easily accomplished, even by an aged or infirm person.

Further features of the invention will be described or will become apparent in the course of the following detailed description.

BRIEF DESCRIPTION OF THE DRAWINGS

In order that the invention may be more clearly understood, a preferred embodiment thereof will now be described in detail by way of example, with reference to the accompanying drawings, in which:

FIG. 2b is a sectional illustration of a top view of the yoke depicted in FIG. 2a;

FIG. 2c is a sectional illustration of a side view of the yoke depicted in FIG. 2a;

DESCRIPTION OF PREFERRED EMBODIMENT

Figure 1:
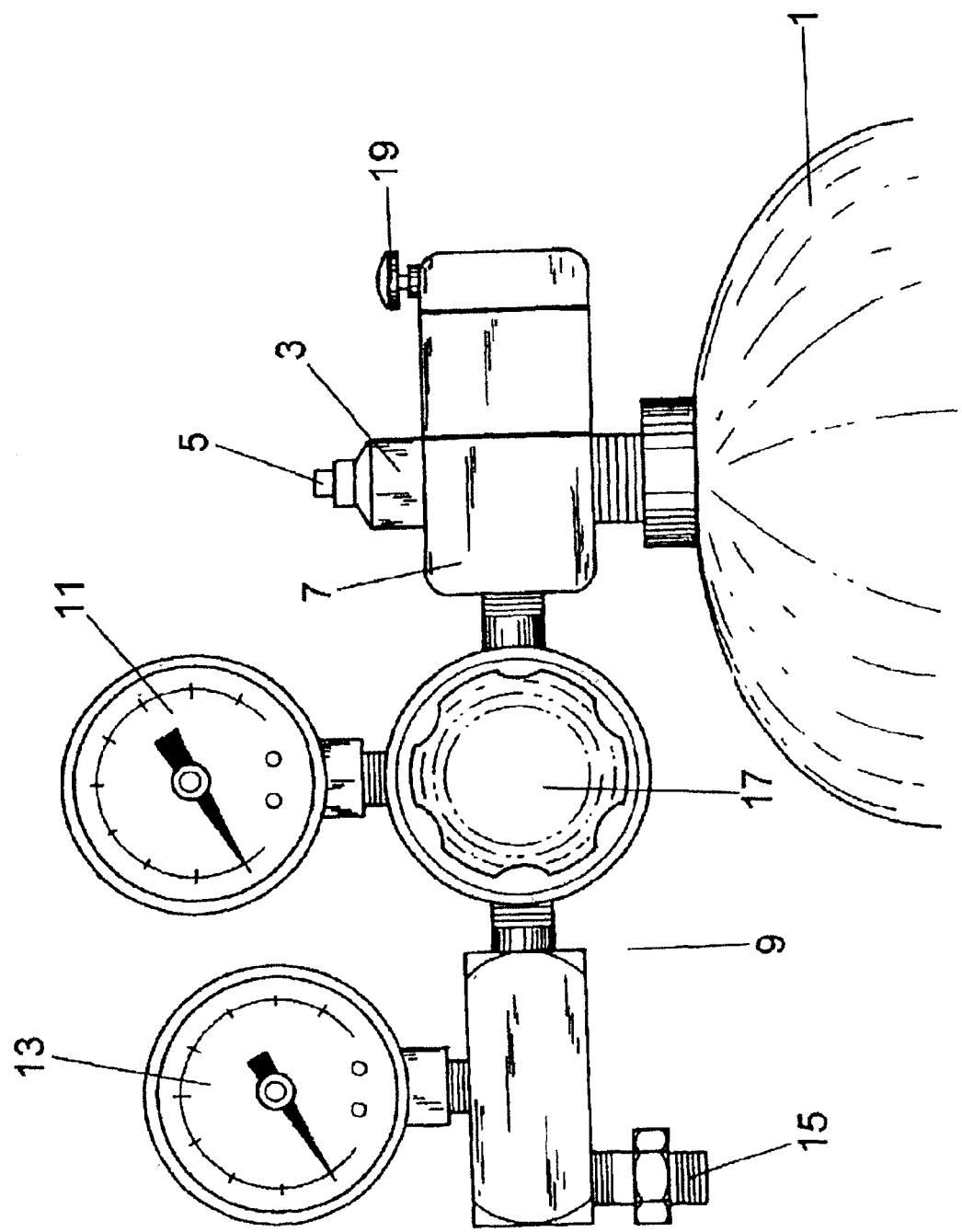
FIG. 1 is a side view of a home oxygen delivery system comprising a yoke of the present invention.

FIG. 1 depicts a home oxygen gas delivery system utilizing a yoke of the present invention. A gas reservoir in the form of a pressurized oxygen cylinder has a tank (1) together with stem (3) and stem valve (5). The stem (3) is inserted through an aperture (not shown) in yoke (7) such that the stem valve (5) is above the yoke (7) and is therefore easily accessible for opening and closing. The yoke (7) is made of brass. Two-stage regulator (9) is mounted on the yoke (7). The regulator (9) comprises pressure gauge (11) and flow gauge (13) for measuring oxygen pressure and flow rate respectively. Threaded gas distribution port (15) is mounted on the regulator. In operation, pressurized oxygen from the tank (1) passes through a gas passage (not shown) in the yoke (7) into the regulator (9) and out through the gas distribution port (15) to be delivered by an oxygen mask to a patient (not shown). Oxygen flow rate may be regulated by flow valve (17) on the regulator and the flow monitored with the flow gauge (13). When the pressure gauge (11) indicates that that a new oxygen cylinder is required, the yoke (7) may be removed from the stem (3) by first closing the stem valve (5) and then releasing the oxygen pressure in the yoke (7) by depressing spring-loaded release valve (19). The yoke (7) may then be easily slid up and over the stem (3) and mounted on a new oxygen cylinder.

Figure 2B:
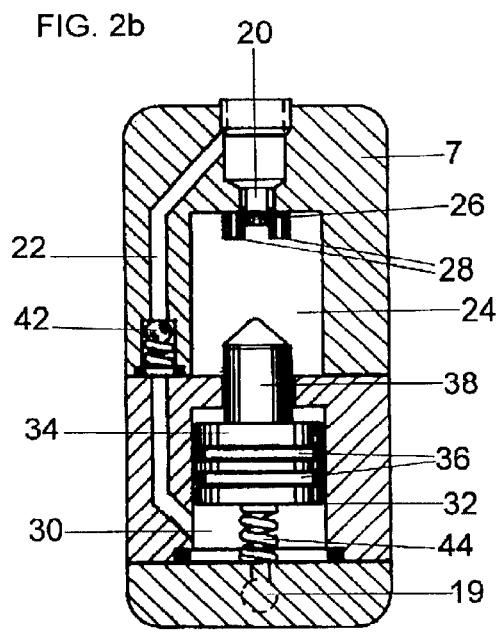
Figure 2A:
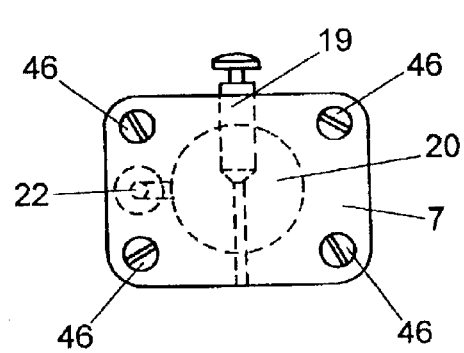
FIG. 2a is a sectional illustration of a front view of the yoke illustrated in the oxygen delivery system depicted in FIG. 1.
Figure 2C:
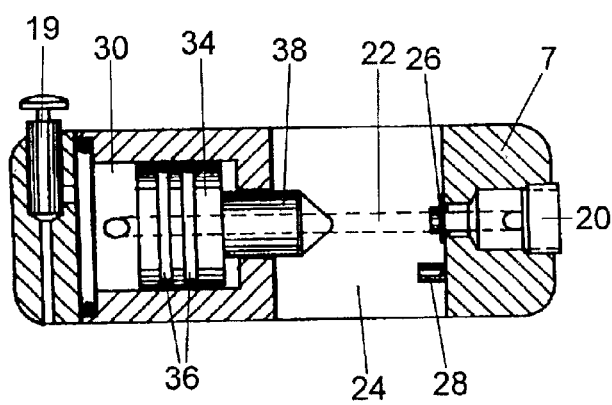

FIGS. 2a, 2b and 2c are sectional illustrations of front, top and side views of the yoke illustrated in the oxygen delivery system of FIG. 1. The stem of the oxygen cylinder and the opening of the stem are not shown for clarity in FIGS. 2a, 2b and 2c, but the following description will assume their presence. Referring to FIGS. 2a, 2b and 2c, aperture (24) in the yoke (7) receives the stem (not shown) of a home oxygen cylinder (not shown). Gas passage (20) is aligned with the opening of the stem (not shown). O-ring (26) located at an end of the gas passage (20) that opens into the aperture (24) helps seal the gas passage (20) to the opening of the stem. Two pins (28) are located near the gas passage (20) and extend into the aperture (24). The pins (28) are located and shaped to fit into standardized dimples on the stem of the oxygen cylinder. The two pins (28) help prevent an operator from mounting the yoke (7) on an incorrect gas cylinder. In operation, pressurized oxygen flows from the opening of the stem into the gas passage (20). A first portion of the pressurized oxygen flows out of the yoke (7) into a regulator (not shown) and thence to a respirator for a patient. A second portion of the pressurized gas flows into gas diverting conduit (22). One-way check valve (42) permits pressurized oxygen to flow in the gas diverting conduit (22) away from the gas passage (20) to cylindrical chamber (30) but prevents flow of oxygen back from the chamber (30) to the gas passage (20). The one-way check valve helps maintain oxygen pressure in the chamber (30) even when the oxygen cylinder is empty. The chamber (30) is an expanded portion of the gas diverting conduit (22). Piston (collectively 32, 34, 36, 38 and 40) is located in the chamber (30). The piston and the chamber form a piston/cylinder arrangement. The piston has a first portion comprising surface (32) of piston barrel (34) having O-rings (36) to help form a seal between the piston barrel (34) and the chamber's wall. The piston further comprises a second portion comprising tapered clamping pin (38) that extends into the aperture (24). Pressurized oxygen in the chamber (30) impinges on surface (32) of piston barrel (34) thereby biasing the piston toward the stem in the aperture (24) thereby engaging the tapered clamping pin (38) with an indentation in the stem, thus clamping the yoke (7) to the stem. Spring (44) acts as a secondary biasing means to aid an operator in initially placing the yoke (7) on the stem.

When an operator desires to remove the yoke (7) from the stem, it is necessary to release pressurized oxygen from the chamber (30). Releasing pressurized oxygen is accomplished by depressing spring-loaded release valve (19), described in greater detail below. Releasing the pressurized oxygen from the chamber (30) disengages the tapered clamping pin (38) from the stem, except for the residual force applied by the spring (44). Since the spring (44) is relatively weak, it is a simple matter to remove the yoke (7) from the stem by sliding the yoke (7) up and over the stem.

The yoke (7) is constructed in three sections and the three sections are held together by four shoulder bolts (46).

Figure 3:
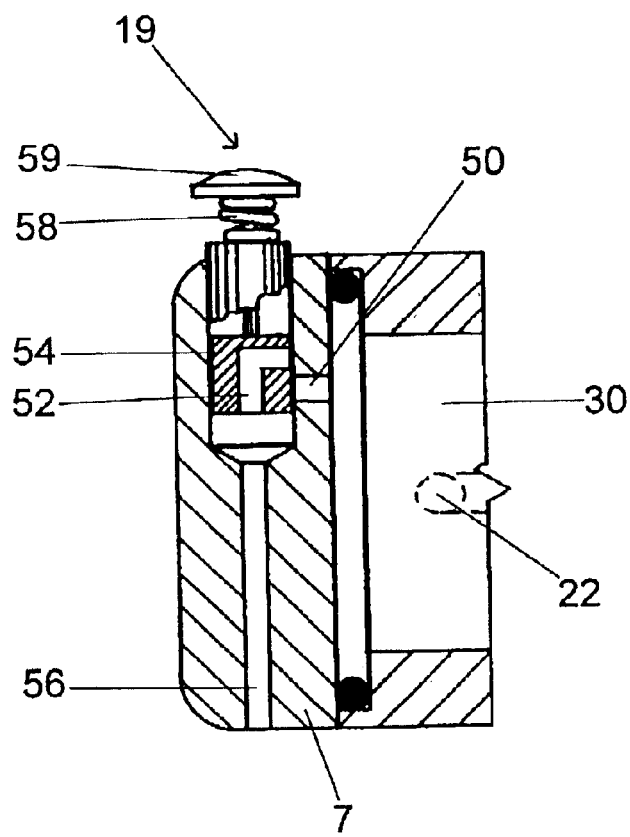
FIG. 3 is a close-up view of a release valve illustrated in the yoke depicted in FIG. 2c; and, FIG. 4 is a close-up view of an alternate embodiment of a release valve usable with a yoke of the present invention.

FIG. 3 is a close-up view of the spring-loaded release valve (19) illustrated in the yoke depicted in FIG. 2c. In operation, pressurized oxygen is received in chamber (30) from gas diverting conduit (22). In fluid communication with chamber (30) is chamber vent (50). The chamber vent (50) is normally blocked from the outside of the yoke (7) by a solid portion of plunger (54) of the spring-loaded release valve (19). By depressing head (59), the plunger (54) is depressed until L-shaped vent (52) in the plunger (54) is in fluid communication with the chamber vent (50). Pressurized oxygen may then escape from the chamber (30) by passing through the chamber vent (50), through the L-shaped vent (52) into vent pipe (56) and then to the outside. Release valve return spring (58) biases the plunger (54) back to its original blocking position when the head (59) is no longer actively depressed.

Figure 4:
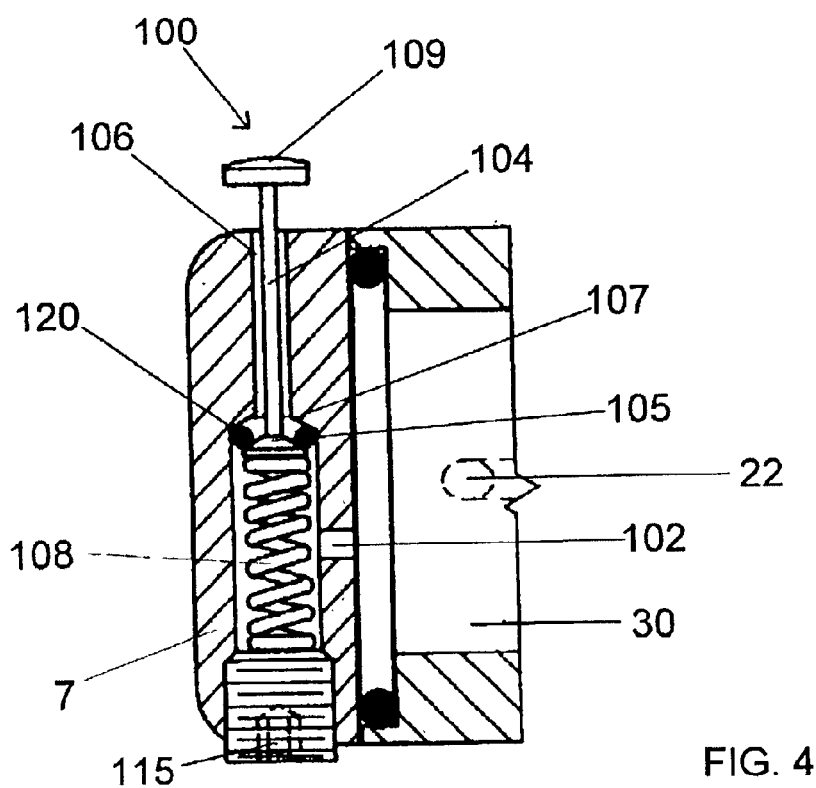

FIG. 4 is a close-up view of a an alternate embodiment of a spring-loaded release valve (100) usable with a yoke of the present invention. In operation, pressurized oxygen is received in chamber (30) from gas diverting conduit (22). In fluid communication with chamber (30) is chamber vent (102). The chamber vent (102) is in fluid communication with a space surrounding release valve return spring (108). Gas is normally blocked from escaping to the outside of the yoke (7) by tapered sealing head (105) of plunger (104) since the tapered sealing head (105) is biased towards plunger seat (107) and O-ring (120) by the release valve return spring (108). By depressing head (109), the plunger (104) and the tapered sealing head (105) are depressed against the release valve return spring (108) thereby unseating the tapered sealing head (105) from the plunger seat (107) and O-ring (120) to thereby create a way around the tapered sealing head (105) through which gas can escape into vent pipe (106). In this manner, pressurized oxygen is permitted to escape from the chamber (30) through the chamber vent (102) into the vent pipe (106) and thence to the outside of the yoke (7). Release valve return spring (108) biases the plunger (104) and the tapered sealing head (105) back to the original blocking position when the head (109) is no longer actively depressed. Set screw (115) helps seal the space surrounding the release valve return spring (108) and provides a seat against which the release valve return spring (108) may be biased when the head (109) is depressed.

Other advantages which are inherent to the structure are obvious to one skilled in the art.

It will be understood that certain features and subcombinations are of utility and may be employed without reference to other features and sub-combinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A pneumatic yoke for a pressurized gas reservoir, the yoke comprising:
   (a) an aperture for receiving a stem of the pressurized gas reservoir, the stem having a stem valve selectively operable to permit a flow of pressurized gas through an opening of the stem;
   (b) a gas passage for alignment with the opening of the stem to accept the flow of pressurized gas;
   (c) a gas diverting conduit in fluid communication with the gas passage;
   (d) a movable clamping member within the gas diverting conduit, the movable clamping member having a surface forming a boundary of the conduit, the boundary displaceable by a flow of gas into the conduit to thereby vary the volume of the conduit to thereby engage the clamping member with the stem; and,
   (e) a release valve in fluid communication with the gas diverting conduit, the release valve selectively operable to permit a flow of gas from the conduit to permit disengagement of the movable clamping member with the stem.

2. The yoke according to claim 1, further comprising a one-way check valve in the conduit between the gas passage and the surface of the movable clamping member.

3. The yoke according to claim 2, wherein a portion of the gas diverting conduit is a chamber having a larger cross-sectional area in which the movable clamping member is displaced.

4. The yoke according to claim 3, wherein the movable clamping member is a piston complementary to and movable within the chamber.

5. The yoke according to claim 4, wherein the piston comprises a tapered portion extending into the aperture for engagement with an indentation on the stem.

6. The yoke according to claim 5, wherein the piston further comprises a secondary biasing means for holding the tapered portion against the stem to prevent misalignment of the gas passage and the opening of the stem while mounting the yoke on the stem.

7. The yoke according to claim 6, wherein the secondary biasing means comprises a spring.

8. The yoke according to claim 1, wherein the release valve is a needle valve.

9. The yoke according to claim 1, wherein the movable clamping member and the gas passage are opposite each other through the aperture.

10. A gas delivery system comprising:
    (a) a pressurized gas reservoir comprising a tank containing pressurized gas, a stem connected to the tank, the stem having a stem valve selectively operable to permit a flow of pressurized gas through an opening of the stem;
    (b) a yoke comprising: an aperture for receiving the stem of the pressurized gas reservoir; a gas passage for alignment with the opening of the stem to accept the flow of pressurized gas; a gas diverting conduit in fluid communication with the gas passage; a movable clamping member within the gas diverting conduit, the movable clamping member having a surface forming a boundary of the conduit, the boundary displaceable by a flow of gas into the conduit to thereby vary the volume of the conduit to thereby engage the clamping member with the stem; and, a release valve in fluid communication with the conduit, the release valve selectively operable to permit a flow of gas from the gas diverting conduit to permit disengagement of the movable clamping member with the stem; and,
    (c) a gas flow and/or pressure regulator mounted on the yoke in fluid communication with the gas passage to accept flow of pressurized gas.

11. The gas delivery system according to claim 10, wherein the pressurized gas reservoir is a pressurized oxygen cylinder for a home oxygen system.

12. The gas delivery system according to claim 10, wherein the pressurized gas reservoir is a SCUBA tank.

13. The gas delivery system according to claim 10, wherein the gas passage of the yoke and the opening of the stem are aligned.

14. The gas delivery system according to claim 11, wherein the movable clamping member comprises a tapered portion extending into the aperture for engagement with an indentation on the stem.

15. The gas delivery system according to claim 14, wherein the yoke further comprises a one-way check valve in the conduit between the gas passage and the surface of the movable clamping member.

16. The gas delivery system according to claim 15, wherein a portion of the gas diverting conduit is a chamber of greater cross-sectional area in which the movable clamping member is displaced.

17. The gas delivery system according to claim 16, wherein the movable clamping member is a piston complementary to and movable within the chamber.

18. The gas delivery system according to claim 17, wherein the piston further comprises a spring for holding the tapered portion against the stem to prevent misalignment of the gas passage and the opening of the stem while mounting the yoke on the stem.

19. The gas delivery system according to claim 18, wherein the release valve is a needle valve.

20. A pneumatic yoke for a pressurized gas cylinder, the yoke comprising:
    (a) an aperture for receiving a stem of the pressurized gas cylinder, the stem having a stem valve selectively operable to permit a flow of pressurized gas through an opening of the stem;

(b) a gas passage for alignment with the opening of the stem to accept the flow of pressurized gas;

(c) a gas diverting conduit in fluid communication with the gas passage, the gas diverting conduit comprising a one-way check valve, a portion of the gas diverting conduit being a chamber of greater cross-sectional area;

(d) a piston having a piston barrel complementary to and movable within the chamber and having a tapered clamping pin extending into the aperture for engagement with the stem, the piston displaceable by a flow of gas into the chamber to thereby vary the volume of the chamber to thereby engage the tapered clamping pin with the stem; and, (e) a release valve in fluid communication with the gas diverting conduit, the release valve selectively operable to permit a flow of gas from the conduit to permit disengagement of the tapered clamping pin with the stem.

21. The yoke according to claim 20, wherein the release valve is a needle valve.

22. The yoke according to claim 20, wherein the piston further comprises a spring for holding the tapered clamping pin against the stem to prevent misalignment of the gas passage and the opening of the stem while mounting the yoke on the stem.

* * * * *